May 21, 1963 R. BEISPEL 3,090,146

RECORD CARD

Filed Jan. 14, 1960 2 Sheets-Sheet 1

INVENTOR.
ROBERT BEISPEL

BY M. A. Hobbs

ATTORNEY

May 21, 1963 R. BEISPEL 3,090,146

RECORD CARD

Filed Jan. 14, 1960 2 Sheets-Sheet 2

INVENTOR.

ROBERT BEISPEL

BY M. A. Hobbs

ATTORNEY 3,090,146
RECORD CARD

Robert Beispel, Miami Beach, Fla., assignor to Cavus Manufacturing Corporation, South Bend, Ind., a corporation of Indiana Filed Jan. 14, 1960, Ser. No. 2,447
7 Claims. (Cl. 40—158)

The present invention relates to a record card and more particularly to a card for mounting film sections and the like, adapted to receive identifying indicia. This application is a continuation-in-part of my application Serial No. 812,432, filed May 11, 1959, now abandoned.

In order to overcome the problem of providing the large amounts of physical space required to store drawings, it is desirable to reduce the drawings to microfilm and retain only the microfilm in permanent records. Although the individual microfilm records of drawings are small in size and thus require smaller amounts of storage space, these films are difficult to handle manually and it is often difficult to quickly select a particular desired drawing because of the necessity of projecting an enlargement of each microfilm drawing to locate the desired one. To obviate this difficulty, microfilm records of individual drawings have been mounted on EAM cards which are punched with drawing identifying indicia so that the microfilm records can be quickly located by the use of conventional card sorting equipment. However, these prior cards mount the microfilm substantially flush with the surface of the card by the use of adhesive material. This flush mounting permits the surface of the microfilm to be scratched when the cards are handled. Further, the adhesive used as a mounting medium "bleeds" out so that the cards tend to stick together when the cards are stacked in permanent files or in card feeding means.

Accordingly, one object of the present invention is to provide a new and improved record card.

Another object is to provide a card construction including new and improved means for mounting a microfilm record.

A further object is to provide a microfilm supporting card which does not require the use of adhesive and which mounts the film in a position recessed below the surface of the card.

A further object is to provide a card with a microfilm receiving opening which is spaced from the edge of the card and which is provided with a hollow cavity extending from one edge of the card to the opening to permit the film to be inserted through the cavity and disposed in an aligned position with the opening recessed from the upper and lower surfaces of the card.

A further object of the invention is to provide a film mounting card which retains the film firmly in place and prevents dislodging thereof throughout all normal use of the card in which the film is mounted, and which is so constructed that the film can readily and efficiently be mounted in the card without any special skill and without complicated tools or equipment.

Still another object is to provide a combination film section mounting pocket construction and film section configuration which facilitate assembly of the film section in the pocket and retention of the section in proper position for viewing, and which permit one film section to be readily removed and another film section substituted therefor without destroying or damaging either the film section or mounting card.

In accordance with these and other objects, an embodiment of the invention comprises a generally flat, rectangular business machine card which may be of a laminated construction. The upper and lower lamina are provided with aligned openings and are secured together except along an area extending from the opening to one of the edges of the card. This provides a hollow cavity or tunnel through which a microfilm can be inserted from the edge of the card to a position aligned with the opening. The upper and lower lamina are also not joined along an area encircling the opening so that a recess is provided for receiving the edges of the film. The frictional adherence between the card and the film is normally sufficient to maintain the card in a position aligned with the opening in the card. However, if desired, the tunnel can be closed by any suitable sealing process following insertion of the film. Thus, the microfilm is mounted on the card in a position recessed from the upper and lower surfaces thereof without requiring the use of adhesive material.

One of the important features of the present invention is the shape of the film section and film cavity or pocket which facilitates assembling the film section in the cavity and retaining the section in proper position for viewing. In this special film configuration, the top and bottom edges of the film, as the film is positioned for insertion in the card cavity, are parallel and correspond to the parallel top and bottom edges of the cavity into which the card is being inserted. The leading edge of the film section, however, is more or less than ninety degrees from the top and bottom edges of the film to provide a slightly pointed effect at one edge of the film below or above the edge of the viewing window in the card. Another important feature of the present invention is the construction including a slight bulge in one of the layers of the card corresponding in size and shape to the size and shape of the cavity. This slight bulge is utilized in the mounting operation in which the bulge effect is enlarged to facilitate insertion of the film section in the cavity.

Figures 5, 6, 7:
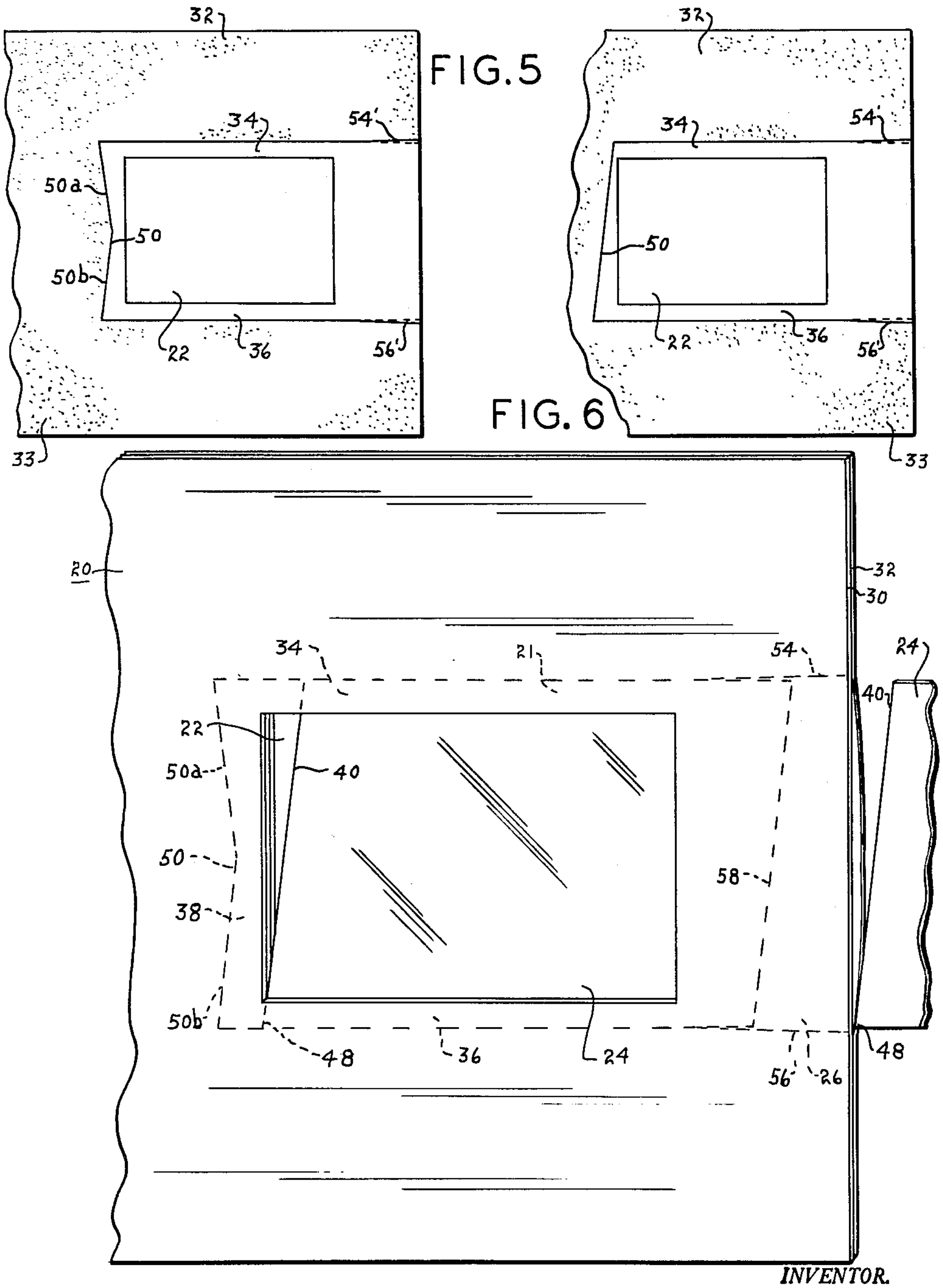
FIGURE 5 is a plan view of one of the two layers of sheet material comprising the present mounting card, showing in greater detail the size, shape and construction of the film receiving cavity or pocket.

FIGURE 6 is a plan view of one of the two layers of sheet material comprising a modified form of the present mounting card, showing the size, shape and construction of the film receiving cavity or pocket; and FIGURE 7 is an enlarged fragmentary perspective view of my film mounting card illustrating the manner in which a film section of my novel configuration is inserted in the film receiving cavity or pocket.

Referring now more specifically to the drawings, a record card indicated generally at 20 which embodies the present invention includes a cavity 21 having a window 22 spaced from the edges of the card for receiving a microfilm 24 in a position that is recessed from the upper and lower surfaces of the card 20. In order to insert the microfilm 24 into a position aligned with the window 22, the card 20 includes a hollow tunnel 26 which extends from one edge of the card 20 to the window 22. Thus the microfilm 24 can be inserted through the tunnel 26 to a position aligned with the window 22. The microfilm 24 is normally held in this aligned position with the window by frictional contact with the card 20. However, if desired, the tunnel 26 can be sealed by suitable means. In some instances, however, it is desirable not to seal the tunnel 26 inasmuch as this permits the removal of the microfilm 24 when a drawing is to be revised or "up-dated." A portion 28 of the card is provided for receiving rows and columns of perforations forming indicia identifying the drawing recorded on the microfilm 24. Thus, a plurality of cards 20 can be inserted into conventional card sorting equipment to provide means for quickly locating the microfilm record of a particular desired drawing.

Card 20 consists of two layers of paper material 30 and 32 secured together by a suitable adhesive covering the entire adjacent surfaces of the two layers with the exception of the area forming the film cavity 21. In order to minimize distortion of the card through handling and changes in moisture conditions, the grains of the paper forming the two layers are matched to counteract the tendency of each layer to become distorted. Thus the internal stresses created in one layer of paper are prevented from distorting the respective layer by stresses in the other layer of paper. Any suitable adhesive may be used to secure the layers 30 and 32 together; however, a thermosetting plastic adhesive 33, such as vinyl heat-regenerative adhesive, is preferably used since it is affected by changes in moisture and temperature conditions and forms a moisture barrier between the two layers and reduces the effect of moisture changes on a stack of cards as well as on the individual cards.

One of the important features of the present invention is the construction of the card and the shape of the film section which make it possible to readily and effectively insert a film section in the card in proper viewing position and thereafter retaining the section in this position while the card is being handled in removing it from a drawer or other storage place, inserting it in a sorting machine and thereafter inserting it in a viewing device and returning it to the storage place. Cavity 21 is slightly larger than the window at the top and bottom to provide grooves 34 and 36 at the top and bottom, respectively, for receiving the upper and lower edges of the film section and guiding the film to its seated position in the cavity for viewing. The width of cavity 21 from top to bottom, i.e. from the inside edges of the two grooves, is such that the film fits snugly in the cavity, however without binding. The leading edge of the film section seats firmly against the inside edge of vertical groove 38 and the trailing edge remains in the tunnel. Thus all four edges of the film section are supported around the periphery of window 22 by grooves 34, 36 and 38 and the inner edge of tunnel 26.

Insertion of the film section in the snugly fitting cavity is accomplished by cutting the leading edge 40 of the film section at an angle between about two to ten degrees from a line perpendicular to the parallel longitudinal edges 42 and 44 of the film section 24. It is important that the leading edge form a protruding portion 48 and that the required angularity of the leading edge start sufficiently near to one of longitudinal edges 42 or 44 at said protrusion that the angularity will extend into either groove 34 or 36. The advantages of the angularity of the leading edge of the film section are illustrated in FIGURE 7. With this construction, as soon as the protruding portion 48 enters tunnel 26, leading edge 40 progressively separates the two layers 30 and 32 on either side of the tunnel so that they do not block or otherwise interfere with the rapid insertion of the film into and through the tunnel. As the film section is advanced further into cavity 21 sliding in grooves 34 and 36, protruding portion 48 enters groove 38 either at the top or bottom, in the illustration shown the protruding portion entering at the bottom of groove 38; thereafter, the rearwardly sloping leading edge 40 separates layers 30 and 32 at the entrance of groove 38 and permits the film section to pass easily into the groove and seat firmly against the inside edge 50 of groove 38. The inside edge 50 of groove 38 is provided with the same angularity as the leading edge of the film throughout at least half of its height. In most embodiments of the present invention, the upper and lower halves 50*a* and 50*b* are sloped in opposite directions at the same angle in order to permit the film section to be inserted in either its normal or inverted position. If desired, however, the same angularity can be used from the top to bottom corresponding to the angularity of leading edge 40. To facilitate starting of the film section in the entrance of tunnel 26, the upper and lower edges 54 and 56 are preferably flared slightly near the edge of the card, as clearly seen in FIGURES 5, 6 and 7 at numerals 54' and 56', and the edges can if desired be made to slope very slightly inwardly towards one another throughout substantially their full length. The shape of trailing edge 58 is not important unless the film section is reversed from end to end and inserted in the cavity; however, it would normally be cut at the same angle as the leading edge, since the trailing edge of one section and the leading edge of the following section are cut simultaneously.

Figure 1:
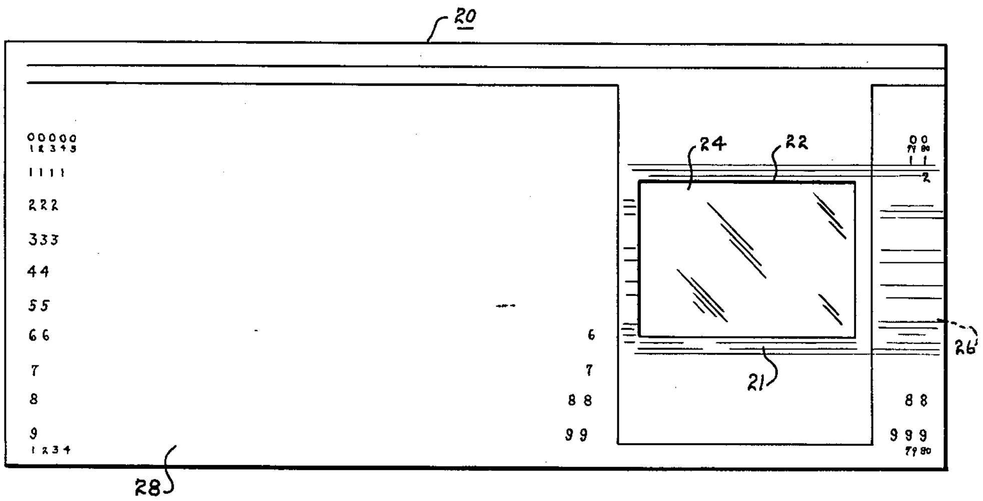
FIGURE 1 is a front plan view of one form of my film mounting card, showing a film section mounted in proper viewing position therein.
Figures 2, 3, 4:
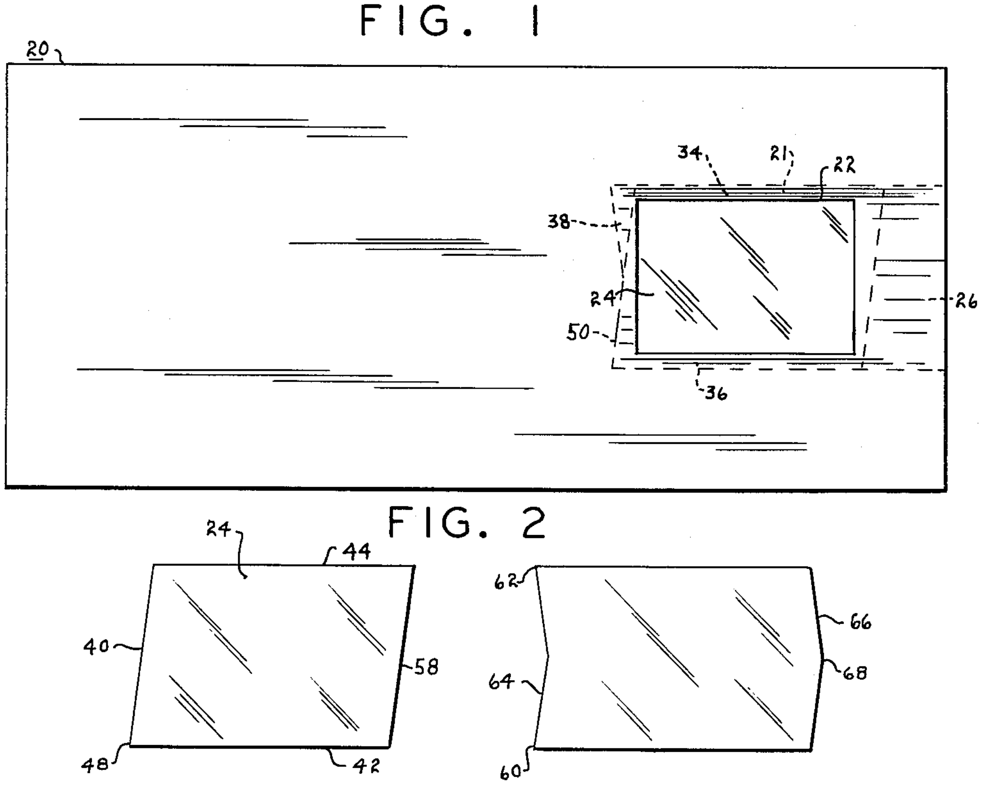
FIGURE 2 is a rear plan view of the film mounting card shown in FIGURE 1.
FIGURE 3 is a section of microfilm or the like cut from a roll of film at the proper angle for efficient assembling of the section in the mounting card shown in FIGURES 1 and 2.
FIGURE 4 is a modified form of a film section also cut for efficient assembly in the mounting card.

A modified form of film section is illustrated in FIGURE 4, which is in effect provided with two protruding portions 60 and 62 corresponding to protruding portion 48 with the angularity of the leading edge 64 from the two protrusions to the center being the same as leading edge 40. These two protruding portions and angular leading edge function the same as the protruding portion 40 and leading edge shown in FIGURE 3, and are adapted to seat on the inside edge 50 of groove 38 of corresponding shape. If desired, the angularity of the two halves or sections of leading edge 64 may be different, i.e. one can be for example four degrees and the other eight degrees from the perpendicular line between the longitudinal sides of the film. In this modified form, the trailing edge 66 is not suitable for use as the leading edge should the film section be reversed from end to end, since protruding portion 68 would not be positioned in either groove 34 or 36.

The present card is constructed to facilitate mounting of a film section in the card, one layer, preferably back layer 32, being provided with a slight bulge at the cavity 21.

While only one cavity 21 with a window 22 is included in the card shown, the card may contain a plurality of cavities 21, and they may be positioned such that the respective tunnel 26 extends to one of the other edges of the card. The size and longitudinal and transverse dimensions may be varied to suit requirements so long as the basic essential characteristics set forth herein are maintained.

After the film section has been mounted in the card in the foregoing manner, the card may be used and filed in that condition, or the layers 30 and 32 at the tunnel may be sealed so that the mounting will be permanent. Various modifications and changes may be made in the present card, and various materials may be used in the construction, without departing from the scope of the invention.

I claim:

1. A laminated mounting card and film combination, comprising two layers of paper material of rectangular shape, a vinyl heat regenerating adhesive securing said layers together throughout with the exception of a portion forming a film receiving cavity, said cavity extending inwardly from one end of the card and having parallel upper and lower edges flaring outwardly near the edge of said card and an inner edge slanting between two and ten degrees from a line perpendicular to said parallel edges, the portion of one of said layers forming a wall of said cavity being substantially flat and the portion of the other of said layers forming a wall of said cavity being bulged slightly outwardly from said end of the card inwardly, said layers having rectangularly shaped viewing windows in the portions forming the walls of said cavity spaced inwardly throughout from the edges of said cavity to form a continuous frame, and a section of film seating in said cavity having parallel upper and lower edges and an edge at an angle corresponding to the angle of the inner edge of said cavity.

2. A laminated mounting card and film combination, comprising two layers of material, an adhesive securing said layers together throughout with the exception of a portion forming a film receiving cavity, said cavity extending inwardly from one end of the card and having parallel upper and lower edges and an inner edge slanting between two and ten degrees from a line perpendicular to said parallel edges, the portion of one of said layers forming a wall of said cavity being substantially flat and the portion of the other of said layers forming a wall of said cavity being bulged outwardly from said end of the card inwardly, said layers having rectangularly shaped viewing windows in the portions forming the walls of said cavity spaced inwardly throughout from the edges of said cavity to form a continuous frame, and a section of film for seating in said cavity having parallel upper and lower edges and an edge at an angle corresponding to the angle of the inner edge of said cavity.

3. A mounting card and film combination, comprising two layers of material, an adhesive securing said layers together with at least one portion between said layers forming a film receiving cavity, said cavity extending inwardly from one edge of the card and having an inner edge slanting from a line perpendicular to the inwardly extending edges of the cavity, the portion of one of said layers forming a wall of said cavity being substantially flat and the portion of the other of said layers forming a wall of said cavity being bulged outwardly from the edge of the card inwardly, said layers having viewing windows in the portions forming the walls of said cavity spaced inwardly throughout from the edges of said cavity to form a continuous frame, and a section of film for seating in said cavity having an edge at an angle corresponding to the angle of the inner edge of said cavity.

4. A mounting card and film combination, comprising two layers of material, an adhesive securing said layers together with at least one portion between said layers forming film receiving cavity means, said cavity extending inwardly from one edge of the card and having an inner edge slanting from a line perpendicular to the inwardly extending edges of the cavity means, and a section of film for seating in said cavity having an edge at an angle corresponding to the angle of the inner edge of said cavity.

5. A mounting card and film combination, comprising two layers of material, an adhesive securing said layers together with at least one portion between said layers forming a film receiving cavity, said cavity extending inwardly from one end of the card and having substantially parallel upper and lower edges and an inner edge slanting between about two and ten degrees from a line perpendicular to said upper and lower edges, said layers having viewing windows in the portions forming the walls of said cavity spaced inwardly throughout from the edges of said cavity to form a continuous frame, and a section of film seating in said cavity having substantially parallel upper and lower edges and an edge at an angle corresponding to the angle of the inner edge of said cavity.

6. A laminated film mounting card, comprising two layers of paper material, and an adhesive securing said layers together throughout with the exception of at least one portion forming a film receiving cavity, said cavity extending inwardly from one end of the card and having parallel upper and lower edges and an inner edge slanting between two and ten degrees from a line perpendicular to said parallel edges, the portion of one of said layers forming a wall of said cavity being substantially flat and the portion of the other of said layers forming a wall of said cavity being bulged slightly outwardly from the edge of the card inwardly, and said layers having rectangularly shaped viewing windows in the portions forming the walls of said cavity spaced inwardly throughout from the edges of said cavity to form a continuous frame.

7. A laminated film mounting card, comprising two layers of material, and an adhesive securing said layers together with a portion between said layers forming a film receiving cavity, said cavity extending inwardly from one end of the card and having parallel upper and lower edges and an inner edge slanting between about two and ten degrees from a line perpendicular to said parallel edges, the portion of one of said layers forming a wall of said cavity being substantially flat and the portion of the other of said layers forming a wall of said cavity being bulged slightly outwardly from the edge of the card inwardly, and said layers having viewing windows in the portions forming the walls of said cavity spaced inwardly throughout from the edges of said cavity to form a continuous frame.

References Cited in the file of this patent

UNITED STATES PATENTS

| | | |
|---|---|---|
| 2,338,189 | Libby et al. | Jan. 4, 1944 |
| 2,385,541 | Rinn | Sept. 25, 1945 |
| 2,587,022 | Langan | Feb. 26, 1952 |
| 2,926,446 | Rinn | Mar. 1, 1960 |

FOREIGN PATENTS

| | | |
|---|---|---|
| 455,610 | France | May 28, 1913 |